United States Patent [19]

Hosaka et al.

[11] 3,827,083

[45] July 30, 1974

[54] MAGNETIC HEAD WHEREIN AN ERASING HEAD IS PERPENDICULAR TO A RECORD-REPRODUCE GAP

[75] Inventors: Iwao Hosaka; Yuji Yokota, both of Chichibu, Japan

[73] Assignees: Canon Kabushiki Kaisha, Tokyo; Canon Denshi Kabushiki Kaisha, Saitama-ken, both of, Japan

[22] Filed: Aug. 30, 1972

[21] Appl. No.: 284,912

[30] Foreign Application Priority Data

Sept. 10, 1971 Japan .......................... 46-82378[U]

[52] U.S. Cl. .................. 360/121, 360/125, 360/118

[51] Int. Cl. .............................................. G11b 5/28

[58] Field of Search ............. 179/100.2 C, 100.2 D; 340/174.1 F; 346/74 MC

[56] References Cited

UNITED STATES PATENTS

| | | | |
|---|---|---|---|
| 2,803,708 | 8/1957 | Cameras | 179/100.2 C |
| 3,079,470 | 2/1963 | Cameras | 179/100.2 C |
| 3,098,126 | 7/1963 | Kaspaul | 346/74 MC |
| 3,228,092 | 1/1966 | Van Langen et al. | 179/100.2 C |
| 3,371,164 | 2/1968 | Makimura | 179/100.2 C |
| 3,480,935 | 11/1969 | Springer | 179/100.2 C |
| 3,485,958 | 12/1969 | Bos et al. | 179/100.2 D |
| 3,508,014 | 4/1970 | Mersing | 346/74 MC |
| 3,562,443 | 2/1971 | Bos | 179/100.2 D |

*Primary Examiner*—Alfred H. Eddleman
*Attorney, Agent, or Firm*—Fitzpatrick, Cella, Harper & Scinto

[57] ABSTRACT

A magnetic head comprises a magnetic record or magnetic record-reproduce head core for forming a magnetized track, and an erase head core secured to the magnetic record-reproduce head core for forming erased tracks along the upper and lower marginal edges of the recorded track formed by the magnetic record or record-reproduce head core. The magnetic record or magnetic record-reproduce head core has at least one effective gap. The erase head core has its erase head gaps formed by the outer edges adjacent said effective gap portion of said magnetic record or magnetic record-reproduce head core and chip members of magnetic anisotropy opposedly disposed through said magnetic record or magnetic record-reproduce core.

7 Claims, 7 Drawing Figures

MAGNETIC HEAD WHEREIN AN ERASING HEAD IS PERPENDICULAR TO A RECORD-REPRODUCE GAP

BACKGROUND OF THE INVENTION

1. Field of the Invention

This invention relates to a magnetic head, and more particularly to a magnetic head in which chip members of magnetic anisotropy are placed in opposed relationship with each other adjacent the upper and lower side edges of a magnetic record or magnetic record-reproduce head core so as to provide the chips with erase flux.

2. Description of the Prior Art

Improvements in the recording characteristic of magnetic recording media have accompanied the need for information to be recorded on such media at very high densities.

In order to form magnetized tracks at a high density on a magnetic recording medium in the form of tape, drum, disc or the like and record and read out a great deal of information on such medium, the positioning of a magnetic head with respect to the information recording section of the magnetic recording medium must be controlled with high accuracy. More specifically, in order to form a number of magnetized tracks at a high density within a limited width of recording medium and play back such tracks, the magnetic head must be highly accurately positioned perpendicularly to the direction of movement of the magnetic recording medium, whereafter the relative position of the magnetic head or of the magnetic recording medium must be sequentially varied without any error.

If a number of magnetized recorded tracks formed by the magnetic head were not accurately located on the magnetic recording medium, the successive magnetized tracks would cumulatively be deviated across the width of the magnetic medium to thereby prevent a magnetic record at a high density from being achieved. When the magnetized tracks are played back, such positional deviations of the tracks would also cause errors in the relative position between the magnetic head and the magnetized recorded tracks on the magnetic recording medium, and such errors would in turn lead to a result that the magnetic head traces only a part of a desired magnetized track to be played back or sometimes would not trace such track at all but reproduce residual noises or part of the other recorded information.

Especially in the memory of an electronic computer which must record and treat information at a high density, the noises thus reproduced as the result of the erroneous tracing action of the magnetic head would form a fatal drawback in the use of the electronic computer.

Some systems have heretofore been proposed to eliminate the above-described disadvantages. One such system is to dispose the gap portion of the erase head perpendicularly to the direction of movement of the magnetic recording medium, i.e., to provide a magnetic head in which the gap in the magnetic record-reproduce head is parallel to the gap in the erase head.

Such a system suffers from a structural disadvantage in that the height of the erase head gap becomes greater than the greatest possible position error for a narrow track width employed for the high density recording. In view of the difficulties encountered in the manufacturing process, this would in turn lead to the undesirable production of an erase head gap which has a greater width than required. Such a magnetic head would also cause an operational disadvantage that the magnetic field produced by the erase head gap unfavorably affects or interferes with the magnetic field produced by the record-reproduce head gap.

Such interference may be reduced by a second known system as disclosed, for example, in page 220 of IBM Technical Disclosure Bulletin, Vol. 8, No. 2, July, 1965. According to the reference, an erase head core is provided on the opposite side edges of a magnetic record-reproduce head core and the gap portion of the erase head is disposed along the direction of movement of a magnetic recording medium and perpendicularly to the gap of the record-reproduce head, so that a magnetized recorded track may be formed by the magnetic head and the upper and lower marginal portions of the magnetized track other than the required track width may be erased by the erase head. With this system, since the erase flux is transverse to the recorded track of data, the effect on the data may be minimized.

Such a magnetic head assembly, however, has a structural disadvantage in that it is cumbersome to accurately attach a single erase head to the opposite side edges of a magnetic record-reproduce head. Further, a very small height is required for the gap in each head when high density recording and reproduction is desired, and this means much difficulty in making and assembling the erase gap. The magnetic head assembly also has an operational advantage in that the leakage flux from the right and left areas of the erase core at the end portion of the rectangular erase gap obliquely intersects the recorded tracks to thereby produce undesirable false gaps in the right and left areas of the erase gap and that the erase core is not orthogonal to the record-reproduce core but presents a configuration in which it is inserted from outside of the record-reproduce core, so that the magnetic path directed toward the front of the erase core imparts interference or other adverse effect to the magnetic path of the record-reproduce core.

A third proposed system is disclosed in Japanese Patent Publication No. 17,679/1969 (U.S. Pat. No. 3,562,443). This system attaches erase head cores integrally to the opposite sides of a magnetic record-reproduce head core in such a manner that erase gaps are disposed at an angle from 0° to 90° with respect to the direction of the track formed by the magnetic head. However, it is technically extremely difficult to form the erase head gaps obliquely to the magnetic record-reproduce head and in addition, the erase head gaps thus formed obliquely to the magnetic head tend to produce erased tracks having an unnecessarily great width on the magnetized recorded track along the opposite margins thereof. Such erased tracks may also be played back by the magnetic record-reproduce head to produce some other noises. Thus, the third known system is unsatisfactory as are the first and second ones described above.

SUMMARY OF THE INVENTION

It is a primary object of the present invention to provide a novel magnetic head which eliminates the disadvantages noted above with respect to the conventional magnetic heads.

It is another object of the present invention to provide a magnetic head in which chip members of magnetic anisotropy are disposed in opposed relationship with each other adjacent the upper and lower side edges of a magnetic record or magnetic record-reproduce head core so as to provide the chips with erase flux.

It is a further object of the present invention to provide a magnetic head of the intersection type in which an erase head core is disposed on the opposite sides of a magnetic record or magnetic record-reproduce head core at the front face thereof to produce an erase flux in such a direction as not to interfere with the record or reproduce flux of the magnetic record or magnetic record-reproduce head core.

It is still a further object of the present invention to provide a magnetic head in which an erase head core is disposed in intersecting relationship with a magnetic record or magnetic record-reproduce head core, the erase head core comprising chip members of magnetic anisotropy disposed in opposed relationship with each other adjacent the upper and lower side edges of the magnetic record or magnetic record-reproduce head core and having its easily magnetizable direction substantially orthogonal to the erase head gap, and a magnetic path member for holding the chip members between itself and the magnetic head core and with spacers interposed therebetween, the magnetic path member forming part of the closed magnetic path of the erase head.

It is yet a further object of the present invention to provide a magnetic head in which an erase head core is disposed in intersecting relationship with a magnetic record or magnetic record-reproduce head core, the erase head core comprising chip members of magnetic anisotropy disposed in opposed relationship with each other adjacent the upper and lower side edges of the magnetic record or magnetic record-reproduce head core and having its easily magnetizable direction substantially orthogonal to the erase head gap, and the opposite ends of a magnetic path member disposed in opposed to the magnetic record or magnetic record-reproduce head core and having its front end portions facing the rear end faces of the chip members so as to form part of the closed magnetic path of the erase head.

In the magnetic head according to an embodiment of the present invention, the magnetic record or magnetic record-reproduce head core comprises a pair of core halves formed of a magnetic material of high permeability. The two core halves abut each other with the clearance therebetween filled with molten glass, which forms a spacer material which in turn provides a front gap. The erase gaps of the erase head core are formed of the outer edges adjacent the front gap portion of the magnetic record or magnetic record-reproduce head core and chip members of magnetic anisotropy opposedly disposed through the magnetic record or magnetic record-reproduce head core. The shape and material of each core and the shaping process thereof will become apparent from the ensuing description.

BRIEF DESCRIPTION OF THE DRAWINGS

The other objects and features of the present invention will become fully apparent from the following detailed description of embodiments thereof taken in conjunction with the accompanying drawings, in which.

DESCRIPTION OF THE PREFERRED EMBODIMENTS

Figure 1:
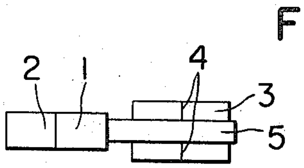
FIG. 1 shows the front construction of a magnetic head assembly having an erase head according to the prior art.

Referring first to FIG. 1, there is shown the front construction of a magnetic head assembly having an erase head according to the prior art. It includes a magnetic head core 1 and erase heads 3 provided on the opposite sides of a non-magnetic member 5 contiguous with the head core 1, each of the erase heads 3 having a gap portion 4 disposed therein perpendicularly to the direction of movement of magnetic recording medium. With such an arrangement, a magnetized recorded track formed by the gap portion 2 of the magnetic record or magnetic record-reproduce head may be erased at the upper and lower margins thereof by the erase heads 3, that is, all the other sections of the magnetized recorded track than a desired width may be erased by the erase heads 3, so that any undesired noise resulting from a positional error of the head during reproduction may be excluded from recording. In the conventional magnetic head of such construction, a material known as Permalloy which is excellent in magnetic characteristic and ready to machine has been chiefly used as the magnetic material for the magnetic record or magnetic record or magnetic record-reproduce head.

In such a system, however, two separate erase heads had to be provided and accurate attachment of them to the opposite sides of the magnetic head was very cumbersome. Further, where recording and reproduction of information at a high density is desired, the track width for each head necessarily becomes very narrow. Thus, these erase heads were difficult to manufacture and assemble. Furthermore, the Permalloy used as the magnetic material is inferior in high frequency characteristic and unsuitable for high density recording.

Figure 2A:
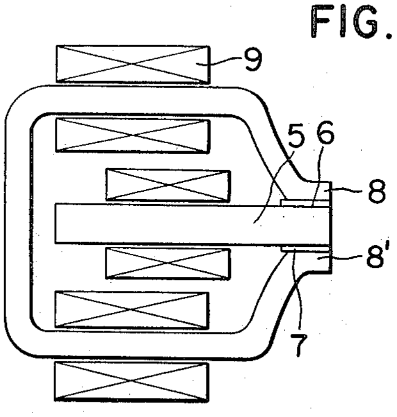
FIGS. 2A and 2B are a side elevation and a front elevation, respectively, of a magnetic head assembly having an erase head heretofore proposed and used.
Figure 2B:
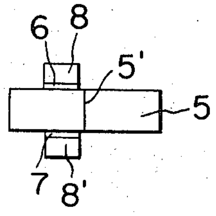

A further method heretofore proposed and practised is shown in FIGS. 2A and 2B. As shown there, erase cores 8 and 8' are opposed to the upper and lower core edges of a magnetic head 5 with spacers 6 and 7 interposed between the respective erase core 8, 8' and the magnetic head 5, to thereby provide a pair of erase head gaps between the erase cores and the head 5. The upper and lower margins of track formed by the gap 5' of the magnetic head 5 may be erased upon excitation of erase coils 9 and 10. In this instance, ferrite which has an excellent high frequency characteristic is used as the magnetic material for the magnetic record or magnetic record-reproduce head.

In the head of this type, however, the erase cores 8 and 8′ are so closely adjacent to the magnetic head core 5 that leakage flux may be produced not only in the direction from the erase head cores 8, 8′ toward the spacer 6, 7 but in other directions, with a result that the area of the formed magnetized track which is erased by the erase head portion would be increased beyond the regions adjacent to the spacers 6 and 7. This has led to a danger that even the information recorded in an entirely distinct track or tracks might be erased away.

The present invention eliminates these disadvantages and some specific embodiments thereof will now be described in detail.

Figure 3A:
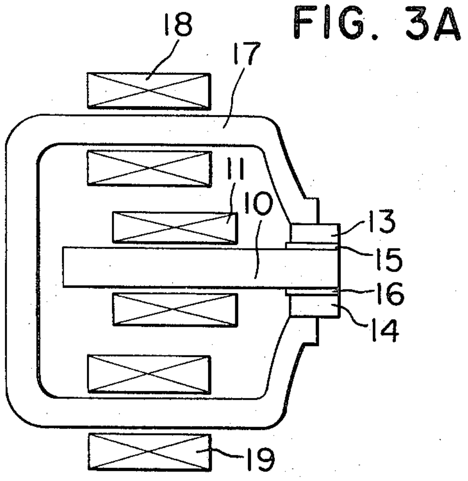
FIGS. 3A and 3B are a side elevation and a front elevation, respectively, of the magnetic head assembly according to an embodiment of the present invention.
Figure 3B:
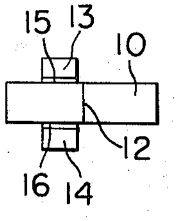

Referring to FIGS. 3A and 3B, there is shown an embodiment of the present invention, which includes a magnetic record or magnetic record-reproduce head core 10 and a coil 11 wound around the core 10. As is conventional with ordinary heads, the core 10 comprises a pair of core halves abutting each other with a spacer material such as molten glass filling the clearance therebetween so as to form a front portion of the core, the core halves being thus integrally joined together. Chips 13 and 14 consisting of a material of magnetic anisotropy are attached to the upper and lower side edges of the core 10 by means of spacer material 15, 16 such as beryllium copper. The material of magnetic anisotropy may be single crystal ferrite, single crystal sendust, single crystal ferroxplana or the like. The crystal structure of single crystal ferrite and of single crystal sendust has a cubic system. The crystal axes of single crystal ferrite are axis <111>, axis <211>, axis <110> and axis <100> if mentioned in the order of easiness for magnetization.

In single crystal sendust whose magnetic anisotropy constant has a different sign from that of single crystal ferrite, the order of crystal axes is reversed, i.e., axis <100>, axis <100>, axis <211> and axis <111>. Further, single crystal ferroxplana has a hexagonal system whose crystal axes are usually represented by *a*, *b*, *c* and *d*, of which the axis *c* alone is easy to magnetize and the other axes are all difficult to magnetize.

The aforesaid chips 13 and 14 may be obtained by cutting a body of single crystal ferrite in such a manner that the axis <110> is parallel to the facet of the chip which is to abut the magnetic record or magnetic record-reproduce head 10, that the axis <111> intersects the erase gap, and that the axis <211> corresponds to the direction of thickness of the chip 13, 14. By doing so, the easy magnetizable direction of the chip 13, 14 can be selected to the direction substantially orthogonal to the spacer material and the hard magnetizable direction can be selected to the direction perpendicular thereto.

When the chips 13 and 14 are to be obtained from a body of single crystal sendust, in which the easy magnetizable direction is just the opposite to that in single crystal ferrite as described above, the directions in which the cutting procedures take place are reversed accordingly.

In the case of single crystal ferroxplana, the easily magnetizable direction *c* may be selected in the direction orthogonal to the gap and the hard magnetizable direction may be selected from among the other axes as desired.

A magnetic path member 17 has its opposite end portions secured in pressure contact with the corresponding surfaces of the chips 13 and 14 and for this purpose, the opposite end portions thereof are made concave with respect to the end portion of the core 10. Such magnetic path member 17 may be formed of a magnetic material of high permeability obtained as by pressing or etching process. Erase coils 18 and 19 are wound on the magnetic path member 17.

The operation of the above-described arrangement will now be described. As a predetermined drive current flows through the coils 11 and 18 (19) and a magnetic medium passes the front of the core 10, a flux leaks from the gap portion 12 to record predetermined information on the magnetic medium. Since the easily magnetizable direction of the chips 13, 14 is substantially orthogonal to the erase head gap, the flux derived from the erase coils 18, 19 provides a flux component intersecting the spacers 15, 16, so that the leakage flux from the chips 13, 14 is restricted to the neighborhood of the spacers 15, 16, and thus the leakage of the erase flux toward the other tracks may be prevented.

Figure 4A:
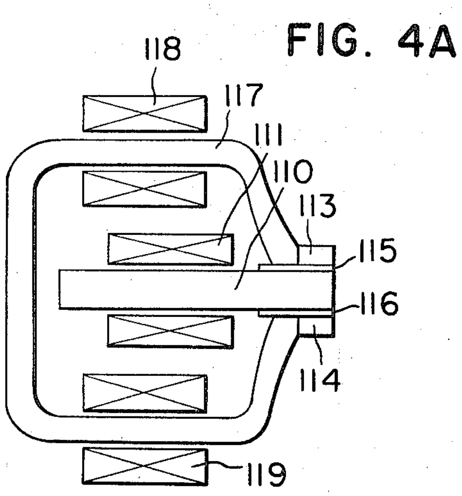
FIGS. 4A and 4B are a side elevation and a front elevation, respectively, of the magnetic head assembly according to another embodiment of the present invention.
Figure 4B:
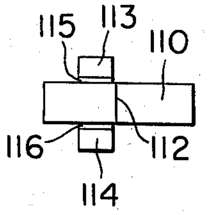

FIGS. 4A and 4B show another embodiment of the high density magnetic head according to the present invention. This embodiment is substantially identical in construction with that of FIG. 3, with the exception that the chips are attached in different locations. A magnetic record or magnetic record-reproduce head core 110 has a coil 111 wound thereon. As is conventional with ordinary heads, the core 110 comprises a pair of core halves abutting each other with a spacer material such as molten glass filling the clearance therebetween so as to form a front gap in the front portion of the core, the core halves being thus integrally joined together. Chips 113 and 114 consisting of a material of magnetic anisotropy are attached to the upper and lower side edges of the core 110 by means of spacer material 15, 16 such as beryllium copper. The material of magnetic anisotropy forming the chips 113 and 114 may be the same as that in the embodiment of FIG. 3, and may be obtained in the same manner as described above with respect to that embodiment. A magnetic path member 117 is different from the member 17 in the previous embodiment in the points to be described hereinafter, and the portions adjacent is opposite ends are disposed in opposed to the spacers 115 and 116 and its opposite end faces are opposed to the rear end faces of the chips 113 and 114. The end faces of the magnetic path member 117 need not always be securely joined to the chips 113 and 114 but may provide a clearance within such a range that the leakage flux from the magnetic path member 117 may be bent by the magnetic path in the easily magnetizable direction of the chips. Such magnetic path member may be formed of a magnetic material of high permeability provided as by pressing or etching process. Erase coils 118 and 119 are wound on the magnetic path member 117.

In the arrangement described just above, the operation is substantially the same as in the embodiment of FIG. 3. As a predetermined drive current flows through the coils 111 and 118 (119) and a magnetic medium passes the front of the core 110, a flux leaks from the gap portion to record predetermined information on the magnetic medium. The flux derived from the erase coil 118, 119, when excited, is bent by the magnetic path in the easily magnetizable direction of the chips 113, 114 and converged in the direction orthogonal to the spacers 115, 116, so that leakage flux for erasing purpose may be produced exclusively from the neighborhood of the spacers 115, 116. Thus, according to the present invention, the leakage flux for erasing can be restricted to the neighborhood of the spacers by selecting the easily magnetizable direction of the chip members in the direction substantially orthogonal to the spacers, so that the leakage flux from the other regions than the neighborhood of the spacers can be extremely minimized, and this is effective to erase only the upper and lower margins of the track defined by the effective gap of the magnetic record or magnetic record-reproduce head. Furthermore, since the leakage flux from the erase core chips is only produced in the very much limited area adjacent to the spacers, the adjacent track is very little affected by such leakage flux and this enables the intertrack spacing to be far narrower than in the prior art, which in turn leads to the provision of a magnetic head suitable for high density recording.

We claim:

1. A cross type magnetic head comprising:

a magnetic record-reproduce head provided with one effective gap for forming a record-reproduce track on a recording medium and having a first core member provided with a record-reproduce coil wound therearound; and an erasing head provided with two erasing gaps each extending perpendicularly to said effective gap to limit said record-reproduce track at both sides thereof, and formed of said first core member, chip members of magnetic anisotropy and a second core member provided with an erasing coil wound therearound and in abutment with said chip member at least at a portion thereof, said chip members being so disposed adjacent both sides of said first core member that hard magnetizable directions thereof are substantially parallel to the respective abutting surface thereof to said erasing gaps;

the ends of said first core member and said chip members being disposed to contact with a sliding surface of the recording medium, while the ends of said second core member being disposed away from the sliding surface of said recording medium.

2. A cross type magnetic head according to claim 1, wherein said chip members have respective easily magnetizable directions substantially perpendicular to the abutting surfaces thereof to said erasing gaps.

3. A cross type magnetic head according to claim 1, wherein single crystal ferrite is used as the material for said chip members.

4. A cross type magnetic head according to claim 1, wherein single crystal sendust is used as the material for said chip members.

5. A cross type magnetic head according to claim 1, wherein single crystal ferroxplana is used as the material for said chip members.

6. A cross type magnetic head comprising:

a magnetic record-reproduce head provided with one effective gap for forming a record-reproduce track on a recording medium and having a first core member provided with a record-reproduce coil wound therearound; and an erasing head provided with two erasing gaps each extending perpendicularly to said effective gap to limit said record-reproduce track at both sides thereof, and formed of said first core member, chip members of magnetic anisotropy and a second core member provided with an erasing coil wound therearound and cooperating with said first core member to support said chip member therebetween, said chip members being so disposed adjacent both sides of said first core member that hard magnetizable directions thereof are substantially parallel to the respective abutting surface thereof to said erasing gaps and that easily magnetizable directions thereof are substantially perpendicular to the respective abutting surface thereof to said erasing gaps;

the ends of said first core member and said chip members being disposed to contact with a sliding surface of the recording medium, while the ends of said second core member being disposed away from the sliding surface of said recording medium.

7. A cross type magnetic head comprising:

a magnetic record-reproduce head provided with one effective gap for forming a record-reproduce track on a recording medium and having a first core member provided with a record-reproduce coil wound therearound; and an erasing head provided with two erasing gaps each extending perpendicularly to said effective gap to limit said record-reproduce track at both sides thereof and formed of, said first core member, chip members of magnetic anisotropy which are so disposed adjacent both sides of said first core member that hard magnetizable directions thereof are substantially parallel to the respective abutting surface thereof to said erasing gaps and that easily magnetizable directions thereof are substantially perpendicular to the respective abutting surface thereof to said erasing gaps, and a second core member provided with an erasing coil wound therearound and supporting said first core member, the ends of said second core member being in abutment with the rear ends of said chip members;

the ends of said first core member and said chip members being disposed to contact with a sliding surface of the recording medium, while the ends of said second core member being disposed away from the sliding surface of said recording medium.

* * * * *